2,729,481

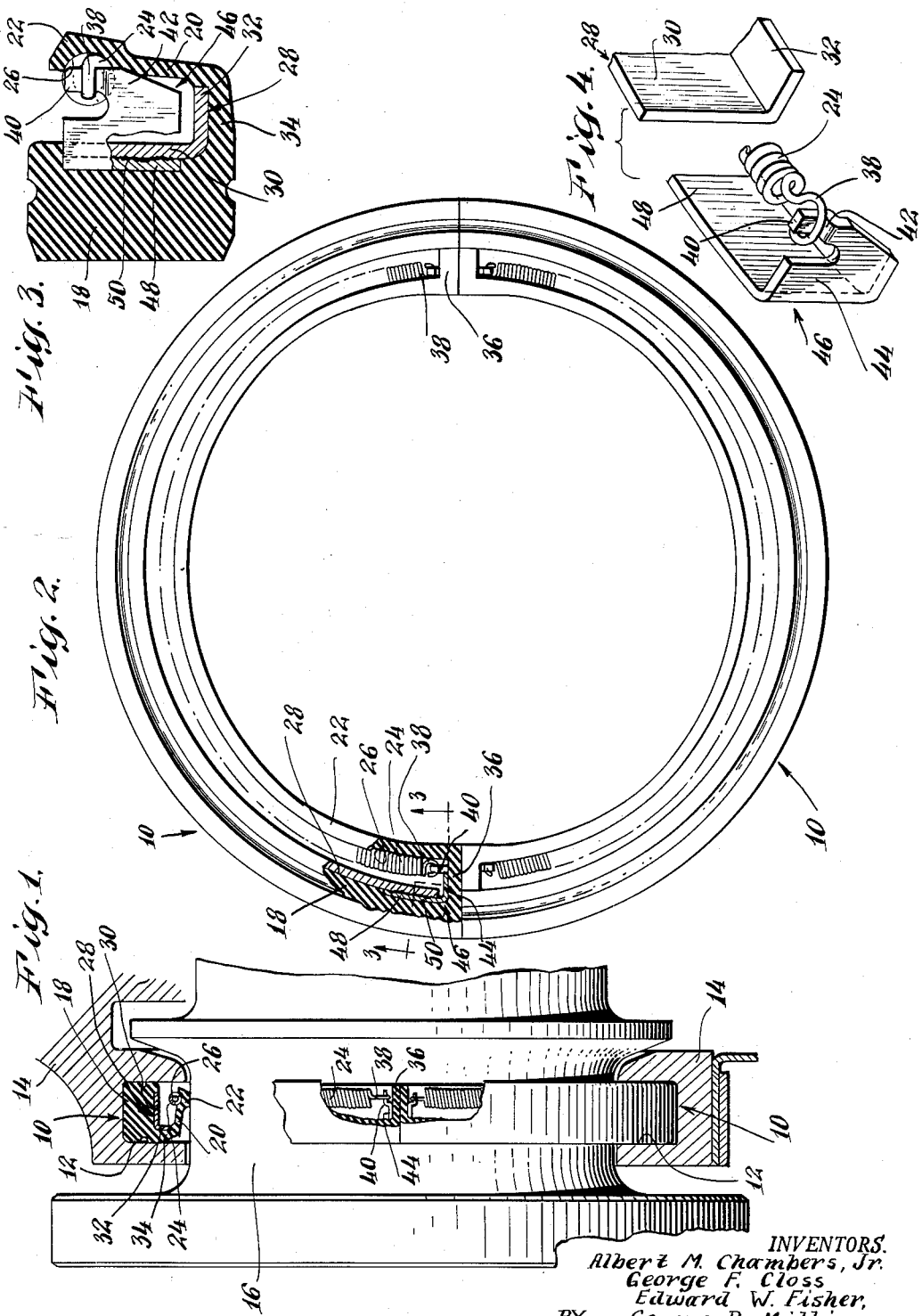

SPLIT OIL SEAL

Albert M. Chambers, Jr., George F. Closs, Edward W. Fisher, and George R. Milligan, Palmyra, N. Y., assignors to The Garlock Packing Company, Palmyra, N. Y., a corporation of New York Application May 22, 1952, Serial No. 289,274

5 Claims. (Cl. 288—13)

This invention relates to devices for sealing a rotatable shaft or the like relatively to an opening of a machine casing through which the shaft extends and is directed more particularly to such devices which, instead of being in the form of a continuous or unbroken annulus as usual, are split to enable them to be applied laterally to a shaft or the like in installations in which it is not practicable to apply them axially of the shaft.

An important object of the invention is the provision of such a split seal in which the constituent parts thereof, considered collectively, have garter spring means associated therewith for urging sealing lip portions of the device into sliding sealing engagement with a related shaft and maintaining such interengagement.

Another important object is the provision of such a split seal having substantially identical, arcuate constituent parts which are interchangeable.

Another important object is the provision of such a split seal in which sealing lip portions which are without spring bias because of being adjacent to abutting ends of arcuate constituent parts of the device, are so formed as to compensate for such lack of spring bias to equalize the sealing contact of such sealing lip portions with other spring-biased sealing lip portions.

Another important object is the provision of such a split seal of simple, rigid hook members to which loop ends of coil springs may be readily attached to function as garter springs for spring biasing the sealing lip portions of the device.

The foregoing and other objects are derived from this invention of which a single embodiment is shown for illustrative purposes in the accompanying drawings without however limiting the invention to that particular embodiment.

In the drawings:

Figure 1 is a side elevational view of an oil seal according to a preferred embodiment of this invention shown in operative association with adjacent portions of a machine casing and a shaft; said casing portion being shown in axial section and the oil seal being partly broken away and partly in radial section to show details.

Fig. 2 is an end view of said oil seal, as viewed from the right side of Fig. 1, partially broken away to show details.

Fig. 3 is a radial sectional view, substantially on the irregular line 3—3 of Fig. 2.

Fig. 4 is a fragmentary, perspective view of portions of a sealing lip biasing spring of the oil seal and adjacent related parts, showing simple yet satisfactory means by which the spring is held in place in the device.

The illustrative embodiment of an oil seal according to this invention which is shown in the drawings comprises two substantially similar, semi-circular packing segments 10 suitably proportioned to fit fluid-tightly within an annular recess 12 (Fig. 1) formed in a machine or motor casing 14 and, more particularly, in an opening in said casing through which extends a shaft 16.

As an example, it may be assumed that casing 14 is a casing of an internal combustion engine, that shaft 16 is the crankshaft of such an engine and that the lower portion of said casing which is below said shaft may be separated, as by unbolting, from the remainder of the engine casing to permit the segments 10 to be installed laterally in the recess 12 and to be replaced when necessary; and that the lower part of the casing may be refastened, as by bolting, to the remainder of the engine casing to cause the latter to completely encircle the shaft.

When the oil seal is thus installed and the two segments 10 are considered collectively as an annular sealing device, it may be said that an annular body portion 18 of the seal fits snugly, usually under some compression, within the annular recess 12, to effect a fixed sealing association of the device with the casing 14; and an annular sealing flange 20, integral with the body portion 18 has an annular sealing lip 22 which effects a sliding seal with the adjacent shaft surface. A contractile, annular garter spring 24 seated within a groove 26 in the outer surface of the sealing flange 20 supplements the inherent resilience of said sealing flange to press and hold the sealing lip 22 firmly in sliding sealing relation to the shaft.

Having in mind, however, that the "annular" characteristic of the several parts to which that term is applied in the next preceding paragraph hereof is, more accurately, semi-annular or semi-circular, it becomes apparent that there are several problems involved in the development of such a split seal which are not present in continuously annular seals. The more important of these problems are (1) how to mount the spring in position, and (2) how to prevent or minimize leakage of the seal at the splits where the segments abut each other. The manner in which the present invention solves these problems should be understood from the following detailed description of one of the two similar segments 10.

Each semi-circular segment 10, as illustrated, is molded, of suitable resilient material, to such dimensions that its body portion 18 will fit snugly and oil tightly with a squeeze fit within one circumferential half of the recess 12. A relatively rigid, semi-circular, metal reinforcing band 28 having a semi-cylindrical flange 30 and a radial flange 32 preferably is molded with the segment with its flange 30 radially underlying the body portion 18 to enhance the squeeze upon the latter and thus enhance its sealing engagement with the walls of the recess 12 and with its flange 32 extending in supporting association with a flexible radial web portion 34 of the packing segment and enhancing the rigidity of the band 28.

The segment 10 may be of an overall circumferential length corresponding to an angle of 180° so that two such segments may constitute a complete substantially circular oil seal with such intimate end to end abutment of the segments as to preclude material leakage at the segment ends. However, the band 28 terminates somewhat short of each end of the segment and each of said segment ends is formed as a solid, flat, radial web 36 of relatively soft flexible material which integrally interconnects the body portion 18 and the sealing flange 20. As the web 36 may be of substantial thickness and, thus, may be deformed in a circumferential direction, the segment may be made of an overall circumferential length which corresponds to an angle slightly greater than 180°. In the latter event, the two related segments are squeezed substantially to the form of a circle by suitable tightening of the two parts of the machine casing in which the recess 12 is formed; the abutting ends of the segments, thus, being very forcibly held together to prevent fluid leakage therebetween.

The spring 24 is held within the groove 26, in semi-circular form, under tension, by having its ends 38 engaged over or within hooks 40 formed by offsetting tongues 42 of radial flanges 44 of similar substantially rigid metal angle brackets 46, cylindrically contoured flanges 48 of which are preferably welded as at 50 to the semi-cylindrical flange 30 of the band 23 near the ends thereof. These brackets are provided at opposite ends of the band 28 of each segment to afford anchorage for opposite ends of the spring. They, also, by intimately underlying the end webs 36, support the latter circumferentially of the segments to hold the adjacent web 36 firmly in sealing engagement with a similar web of a related, abutting segment.

When the several machine casing parts 14 are tightly bolted together, the recess 12 is perfectly circular and the body portions 18 of the two segments 10 fit substantially perfectly therewithin to effect a good stationary seal between the oil seal and the machine casing. The adjacent surface of the shaft 16, of course, is perfectly cylindrical, hence, for most uniform and effective sealing between the sealing lip 22 and the shaft, it is highly desirable that the sealing surface of said lip in the latter's unstressed condition, as before being associated with the shaft, should closely approximate a circle in shape.

In some installations and particularly in some sizes of seals as thus far described, the unstressed sealing lips 22 of assembled segments may be sufficiently non-circular in shape to fail to give an adequately high degree of uniformity and efficiency of sliding sealing effect when associated with a shaft.

Such non-circularity may arise from several factors the more obvious of which are that the garter coil springs are each effective intermediate their ends to urge the sealing lips 22 inwardly, but are not thus effective in the abutting ends of the segments, and, also, that the radial webs 36 inhibit such inward urging or deflection of the sealing lips adjacent to said abutting ends of the segments. Thus, as thus far described, the single sealing lip formed by two abutting segments is very slightly oval in its normal condition before being installed in a machine, the greater diameter of the oval being at a diameter coinciding with the points of abutments of the segments and the lesser diameter being 90° removed from the greater diameter.

Even in the presence of such non-circularity, seals according to this invention may operate satisfactorily, but it has been found advantageous to minimize or obviate such non-circularity by giving the mold in which the seal is molded such shape as to form the sealing lip 22 slightly thicker at the abutting ends of the segments and graduated to be slightly thinner intermediate said ends. Close inspection of the sealing lip as shown in Fig. 2 will disclose these thickness variations which render the sealing surface of the sealing lip more nearly circular when in its unstressed condition.

It should be apparent, from the present disclosure and description of one illustrative embodiment of this invention, that it achieves all the hereinbefore stated objects. It should be understood that the present inventive concept may be utilized in other embodiments without departing from the invention as set forth in the following claims.

What we claim is:

1. A split oil seal comprising plural, abutting, packing segments collectively constituting an annular fluid-sealing assembly, each of said segments comprising an outer, arcuate body portion having relatively rigid, radially inwardly extending end flanges at opposite ends thereof, an inner, flexible, arcuate sealing flange integral with said body portion but having a sealing lip portion separated from a radially opposed part of said body portion by an axially facing, arcuate recess, radial end webs of resilient material at opposite ends of the segment interconnecting the said body portion and sealing flange, and a longitudinally tensioned coil spring in said recess with its ends connected to said end flanges intermediate portions of the spring being in radially inwardly pressing engagement with said sealing flange, due to the tendency of the tension of the spring to be effective in a straight line.

2. A split oil seal according to claim 1, the said sealing lip portion being gradually slightly thicker in a radial direction toward the ends of the segment than at other parts of said lip portion.

3. A split oil seal according to claim 1, each of said segments further including a relatively rigid, arcuate, metal band, fixedly associated with said body portion in parallelism with the latter; said end flanges being rigidly associated with opposite ends of said band in underlying, supporting association with said end webs.

4. A split oil seal according to claim 3, further including rigid angle brackets at opposite ends of said band and each of said end flanges constituting a part of one of said brackets and having a tongue about which an end portion of said spring extends for anchorage thereto.

5. A split oil seal comprising plural, abutting packing segments collectively constituting an annular fluid-sealing assembly, each of said segments comprising an outer arcuate body portion of relatively soft, deformable material, an inner, flexible, arcuate sealing flange integral with one side of said body portion and extending axially and in radial alignment with said body portion in spaced relation to a substantial part of the latter and having a circumferentially extending groove in its outer face, a relatively rigid reinforcing band intimately underlying the inside surface of said body portion and partially defining, with said sealing flange, an axially facing, arcuate recess, radial end webs of resilient material interconnecting the said body portion and sealing flange, relatively rigid, radially inwardly extending end flanges, integrally associated with the ends of said band, and, with said webs, constituting radial end walls of the segment, and a longitudinally tensioned coil spring in said recess connected at its ends to said radial end flanges with intermediate portions of the spring in inwardly pressing engagement with said sealing flange within the latter's said groove.

References Cited in the file of this patent

UNITED STATES PATENTS

| | | |
|---|---|---|
| Re. 21,475 | Olsen | June 4, 1940 |
| 976,369 | Huhn | Nov. 22, 1910 |
| 1,912,793 | Peterson | June 6, 1933 |
| 2,272,455 | Withington | Feb. 10, 1942 |
| 2,272,650 | Von Veh | Feb. 10, 1942 |
| 2,287,357 | Nyborg | June 23, 1942 |
| 2,480,116 | Brummer | Aug. 30, 1949 |
| 2,565,190 | Winkeljohn | Aug. 21, 1951 |
| 2,598,094 | Augereau | May 27, 1952 |

FOREIGN PATENTS

| | | |
|---|---|---|
| 700,403 | Germany | Dec. 19, 1940 |
| 719,760 | Germany | Apr. 16, 1942 |